(12) United States Patent
Yanagawa et al.

(10) Patent No.: US 11,001,226 B2
(45) Date of Patent: May 11, 2021

(54) WEBBING TAKE-UP DEVICE

(71) Applicant: KABUSHIKI KAISHA TOKAI-RIKA-DENKI-SEISAKUSHO, Aichi (JP)

(72) Inventors: Wataru Yanagawa, Aichi (JP); Shinichi Okubo, Aichi (JP); Shigeki Hashimoto, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 55 days.

(21) Appl. No.: 16/469,828

(22) PCT Filed: Nov. 17, 2017

(86) PCT No.: PCT/JP2017/041542
§ 371 (c)(1),
(2) Date: Jun. 14, 2019

(87) PCT Pub. No.: WO2018/116719
PCT Pub. Date: Jun. 28, 2018

(65) Prior Publication Data
US 2020/0086826 A1    Mar. 19, 2020

(30) Foreign Application Priority Data

Dec. 19, 2016   (JP) .............................. JP2016-245909

(51) Int. Cl.
*B60R 22/36*     (2006.01)
*B60R 22/46*     (2006.01)
(52) U.S. Cl.
CPC .......... *B60R 22/4628* (2013.01); *B60R 22/36* (2013.01); *B60R 2022/468* (2013.01)

(58) Field of Classification Search
CPC . B60R 22/36; B60R 22/4628; B60R 22/4633; B60R 2022/468; B60R 2022/4647
See application file for complete search history.

(56) References Cited

U.S. PATENT DOCUMENTS

| | | |
|---|---|---|
| 5,887,814 A | 5/1999 | Matsuki et al. |
| 5,954,287 A | 9/1999 | Hirase |
| | (Continued) | |

FOREIGN PATENT DOCUMENTS

| | | |
|---|---|---|
| EP | H10-119719 A | 5/1998 |
| EP | H10-310026 A | 11/1998 |
| | (Continued) | |

OTHER PUBLICATIONS

International Search Report and Written Opinion issued in corresponding International Application No. PCT/JP2017/041542 dated Feb. 13, 2018.

*Primary Examiner* — Sang K Kim
(74) *Attorney, Agent, or Firm* — Roberts Calderon Safran & Cole P.C.

(57) ABSTRACT

A webbing take-up device is provided with a spool that takes up a webbing, a lock base, and a cover plate that covers an outer periphery of the lock base. A tooth portion is formed at the outer periphery of the lock base. The lock base rotates the spool when a rack contacts the tooth portion. The webbing take-up device is further provided with a guide provided at the cover plate. The guide supports the lock base to be rotatable. Thus, contacting together of the ratchet teeth and the lock base is restricted.

6 Claims, 9 Drawing Sheets

(56) References Cited

U.S. PATENT DOCUMENTS

2011/0140501 A1* 6/2011 Shiotani .............. B60R 22/4628
297/474
2016/0221534 A1 8/2016 Asako
2019/0308585 A1* 10/2019 Yanagawa ............... B60R 22/46

FOREIGN PATENT DOCUMENTS

| JP | 2002-200965 A | 7/2002 |
| JP | 2007-69686 A | 3/2007 |
| JP | 2015-054650 A | 3/2015 |
| JP | 2015-54651 A | 3/2015 |

* cited by examiner

WEBBING TAKE-UP DEVICE

CROSS-REFERENCE TO RELATED APPLICATIONS

The present application is a U.S. National Phase of PCT/JP2017/041542 filed on Nov. 17, 2017, claiming priority under 35 USC 119 from Japanese Patent Application No. 2016-245909 filed Dec. 19, 2016. The disclosure of which is incorporated by reference herein.

TECHNICAL FIELD

The present invention relates to a webbing take-up device.

BACKGROUND ART

A seatbelt retractor recited in Japanese Patent Application Laid-Open (JP-A) No. 2007-69686 is provided with a rotary member that rotates together with a webbing, a lock pawl provided at the rotary member, and inner teeth provided at an outer periphery of the rotary member. During a rapid vehicle deceleration, pulling-out of the webbing is restricted by the lock pawl engaging with the inner teeth. This retractor is further provided with a ring gear provided with outer teeth, a piston ball (moving body) that pushes the outer teeth and causes the ring gear to rotate, a pipe that accommodates the piston ball, and a gas generator that provides dynamic force to the piston ball. During a rapid vehicle deceleration, the piston ball receives gas pressure and pushes the outer teeth. As a result, the ring gear rotates, and the spool engaged with the ring gear rotates. Thus, the webbing is taken up.

SUMMARY OF INVENTION

Technical Problem

In a seatbelt retractor with this structure, if the rotary member is decentered when the moving body receives gas pressure and drives the rotary member, an outer periphery face of the rotary member may contact the inner teeth.

In consideration of the circumstances described above, an object of the present invention is to provide a webbing take-up device that may restrict contacting of ratchet teeth provided at one of a rotary member or an outer periphery body against another of the rotary member or the outer periphery body.

Solution to Problem

A webbing take-up device according to a first aspect of the present invention includes: a spool that rotates in a take-up direction and takes up a webbing; a rotary member, a tooth portion being formed at an outer periphery of the rotary member, and the rotary member causing the spool to rotate due to a moving member contact the tooth portion; an outer periphery body that covers the outer periphery of the rotary member; ratchet teeth that are provided at one of the rotary member or the outer periphery body; a lock pawl that is provided at another of the rotary member or the outer periphery body, the lock pawl restricting rotation of the rotary member in a pull-out direction by engaging with the ratchet teeth, the pull-out direction being an opposite direction to the take-up direction; and a bracing portion provided at the outer periphery body, the bracing portion restricting contact between the ratchet teeth and the other of the rotary member or the outer periphery body by supporting the rotary member so as to be rotatable.

The webbing take-up device of the first aspect is provided with the rotary member at whose outer periphery the tooth portion is formed. The spool can be rotated by the moving member contacting the tooth portion. The bracing portion that supports the rotary member to be rotatable is provided at the outer periphery body. The bracing portion restricts contacting together of the ratchet teeth provided at the one of the rotary member and outer periphery body and the other of the rotary member and outer periphery body.

In a webbing take-up device according to a second aspect of the present invention, the rotary member includes a flange that restricts movement of the rotary member, relative to the outer periphery body, in an axial direction of the rotary member, and an outer periphery of the flange is supported by the bracing portion.

According to the webbing take-up device of the second aspect, the flange functions to support the rotary member to be rotatable and also functions to restrict movement of the rotary member in a thrust direction (the axial direction).

In a webbing take-up device according to a third aspect of the present invention, the bracing portion is provided at a side to which the rotary member is decentered by contact between the tooth portion and the moving member.

According to the webbing take-up device of the third aspect, it is sufficient that the bracing portion be provided only at the side toward which the rotary member decenters when the rotary member decenters due to contacting together of the tooth portion of the rotary member and the moving member. Thus, because it is not necessary to provide the bracing portion at the whole of the outer periphery of the rotary member, fabrication costs may be restrained.

In a webbing take-up device according to a fourth aspect of the present invention, the outer periphery body includes an interior wall face that intersects a rotation radial direction of the rotary member, and the bracing portion is fixed to the outer periphery body in a state in which the bracing portion abuts the interior wall face.

According to the webbing take-up device of the fourth aspect, because the bracing portion is abutted against the interior wall face of the outer periphery body, a pushing force of the rotary member that the contact surface of the bracing portion receives is transmitted directly to the interior wall face of the outer periphery body. Therefore, a fixing force of the bracing portion may be reduced.

In a webbing take-up device according to a fifth aspect of the present invention, the moving member is a rod-shaped member fabricated from resin, and the rotary member is pushed toward the bracing portion by the tooth portion meshing with the moving member.

According to the webbing take-up device of the fifth aspect, because the tooth portion that drives rotation of the spool is meshed with the rod-shaped member fabricated from resin, the rotary member is supported by the bracing portion to be rotatable even when the rotary member is pressed toward the bracing portion.

Advantageous Effects of Invention

As described above, according to the webbing take-up device according to the present invention, an excellent effect is provided of restricting contact between the ratchet teeth provided at the one of the rotary member or the outer periphery body and another of the rotary member or the outer periphery body.

DETAILED DESCRIPTION

Figure 1:
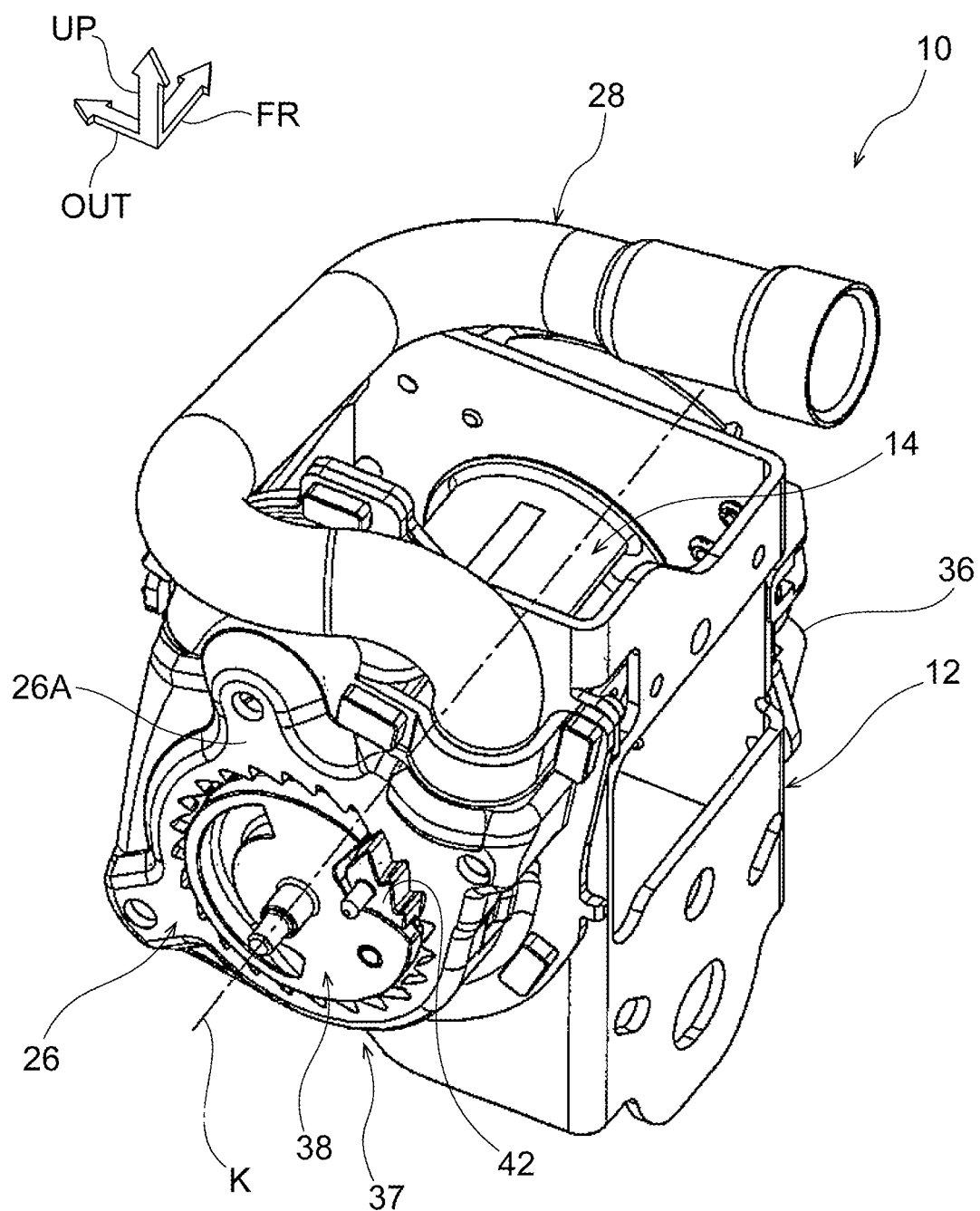
FIG. 1 is a perspective view of a webbing take-up device according to an exemplary embodiment of the present invention.

A webbing take-up device 10 according to an exemplary embodiment of the present invention is described using FIG. 1 to FIG. 5. Although a vehicle is not shown in the drawings, the arrow FR that is shown where appropriate in the drawings indicates the vehicle front (progress direction) and the arrow UP that is shown where appropriate in the drawings indicates the vehicle upper side. The arrow OUT indicates an outer side in the vehicle width direction.

The webbing take-up device 10 depicted in FIG. 1 is installed in the vehicle that is not shown in the drawings, and is provided with a frame 12 that structures a main body of the webbing take-up device 10.

Frame

Figure 2:
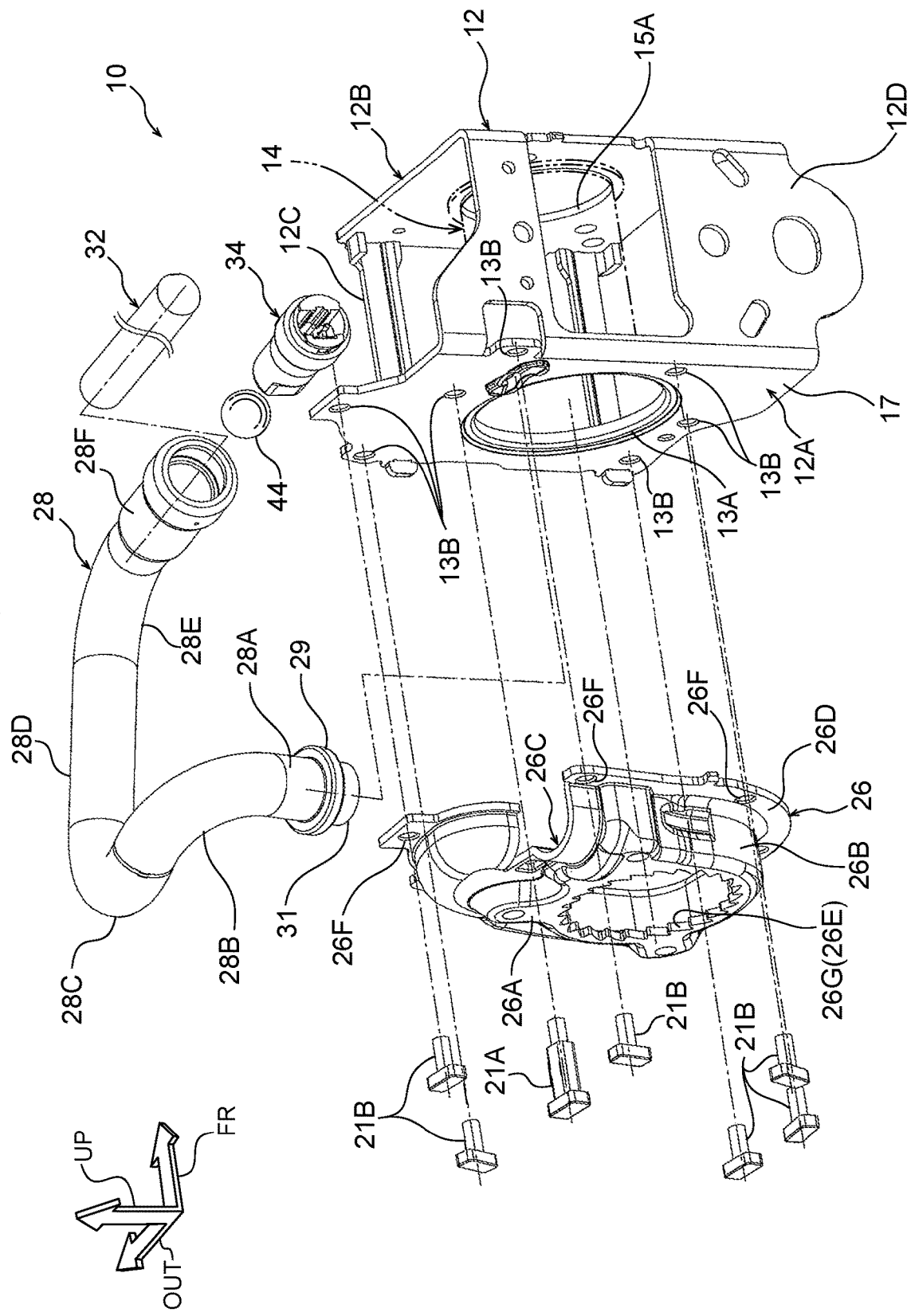
FIG. 2 is an explanatory diagram depicting states of attachment of a pipe and a cover plate to a frame according to the exemplary embodiment of the present invention.

The frame 12 depicted in FIG. 2 is fixed to a vehicle lower side portion of a center pillar of the vehicle, which is not shown in the drawings. As an example, the frame 12 is formed in a square tube shape as viewed in the vehicle vertical direction. More specifically, the frame 12 includes a leg plate 12A and a leg plate 12B that oppose one another substantially in the vehicle front-and-rear direction, and a rear plate 12C and a front plate 12D that oppose one another substantially in the vehicle width direction. The rear plate 12C and front plate 12D link together end portions at both sides in the vehicle width direction of the leg plate 12A with end portions at both sides in the vehicle width direction of the leg plate 12B.

The leg plate 12A extends substantially in the vehicle width direction and the vehicle vertical direction, with a thickness direction in the vehicle front-and-rear direction. A cover plate 26, which is described below, is attached to the leg plate 12A from the vehicle rear side thereof. A first hole portion 13A and plural second hole portions 13B are formed in the leg plate 12A.

The first hole portion 13A penetrates through the leg plate 12A in the vehicle front-and-rear direction in a region of the leg plate 12A that is substantially central in the vehicle width direction and the vehicle vertical direction. Viewed in the vehicle front-and-rear direction, the first hole portion 13A is formed in a circular shape. The size of the first hole portion 13A is a size into which a spool 14, which is described below, can be inserted in the vehicle front-and-rear direction, and is a size that allows rotation of the spool 14 about a central axis thereof. Thus, in a state in which the frame 12 accommodates the spool 14 thereinside, the frame 12 supports the spool 14 to be rotatable.

The plural second hole portions 13B are formed in portions of the leg plate 12A that are peripheral to the first hole portion 13A. The second hole portions 13B penetrate through the leg plate 12A in the vehicle front-and-rear direction. Rivets 21A and rivets 21B are inserted into the plural second hole portions 13B.

The leg plate 12B is disposed at the vehicle front side relative to the leg plate 12A, and extends substantially in the vehicle width direction and the vehicle vertical direction. A third hole portion 15A is formed in the leg plate 12B. The third hole portion 15A penetrates through the leg plate 12B in the vehicle front-and-rear direction. A size of the third hole portion 15A is a size into which a vehicle front side end portion of the spool 14 can be inserted, and is a size that allows rotation of the spool 14 about the central axis thereof.

Spool

Figure 3:
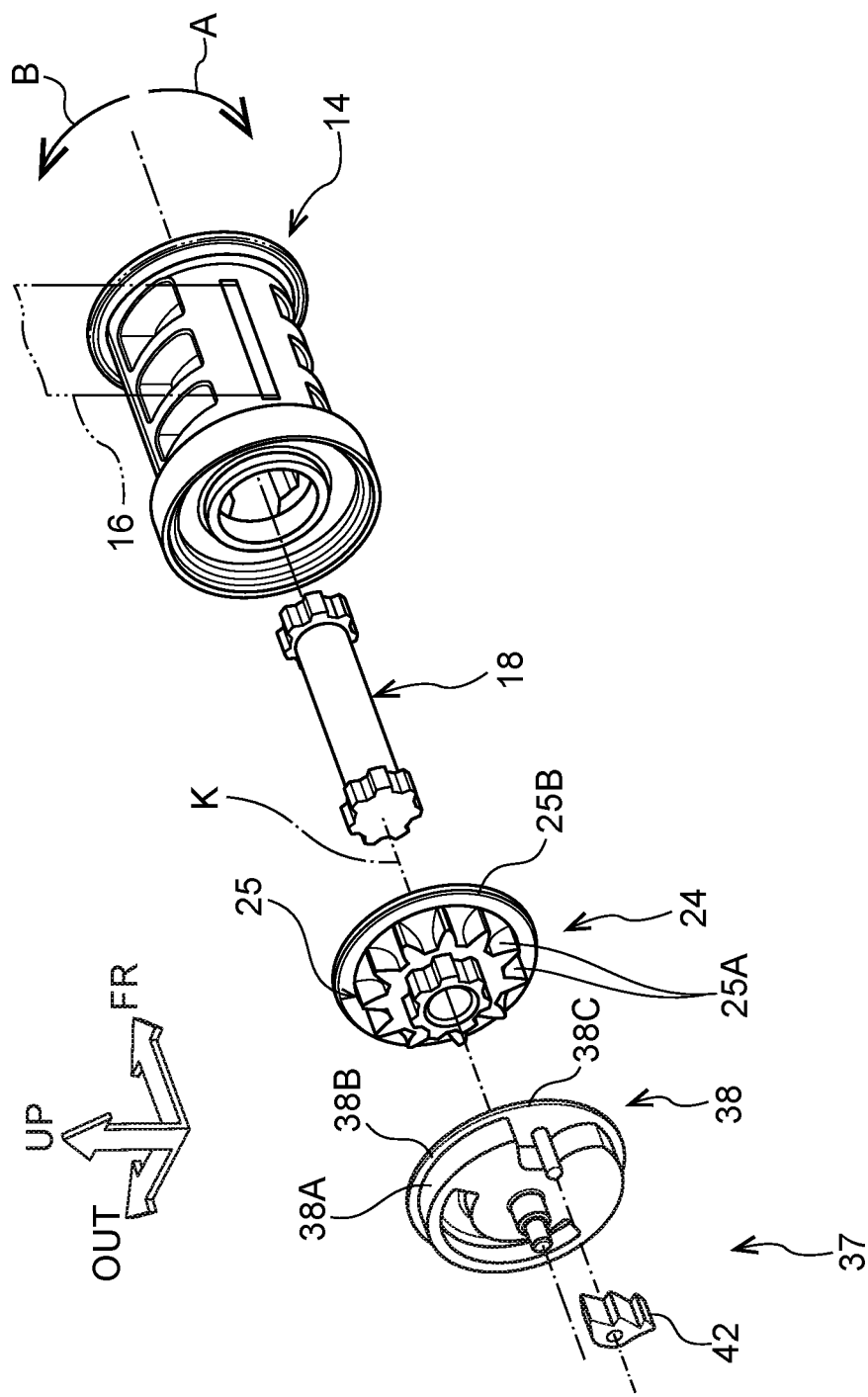
FIG. 3 is an exploded perspective view depicting a spool according to the exemplary embodiment of the present invention and members that are attached to the spool.

In the state in which the spool 14 illustrated in FIG. 3 is provided at the frame 12 (see FIG. 2), the spool 14 is rotatable about a central axis K along the axial direction substantially in the vehicle front-and-rear direction. A length direction base end portion of a webbing 16 in a long, narrow belt shape is anchored at the spool 14. The webbing 16 is taken up onto the spool 14 from the length direction base end side thereof by the spool 14 being rotated in a take-up direction (the direction of arrow A).

A length direction distal end side of the webbing 16 extends from the spool 14 toward the vehicle upper side. At the vehicle upper side from the frame 12 (see FIG. 2), the length direction distal end side of the webbing 16 passes through a slit hole in a through anchor, which is not shown in the drawings, and is turned back toward the vehicle lower side. The through anchor is supported at the center pillar that is not shown in the drawings. A length direction distal end portion of the webbing 16 is anchored at an anchor plate, which is not shown in the drawings. The anchor plate is formed by a metal plate of steel or the like. The anchor plate is fixed to a floor portion of the vehicle, a framework member of a seat corresponding with the webbing take-up device 10, or the like, which are not shown in the drawings.

A seatbelt device for a vehicle at which the webbing take-up device 10 is employed includes a buckle apparatus, which is not shown in the drawings. The buckle apparatus is provided at the vehicle width direction inner side of the seat at which the webbing take-up device 10 is employed. In a state in which the webbing 16 is wrapped round the body of a vehicle occupant sitting on the seat, a tongue provided at the webbing 16, which is not shown in the drawings, is engaged with the buckle apparatus. Thus, the webbing 16 is applied to the body of the vehicle occupant.

Spring Housing

A spring housing 36 is provided at the vehicle front side relative to the frame 12 illustrated in FIG. 1. A spool urging means such as a spiral spring or the like, which is not shown in the drawings, is provided inside the spring housing 36. The spool 14 is urged in the take-up direction of the webbing 16 (the direction of arrow A shown in FIG. 3) by an urging force of the spool urging means. At the vehicle rear side relative to the frame 12, a lock mechanism 37 is provided.

Lock Mechanism

Figure 5:
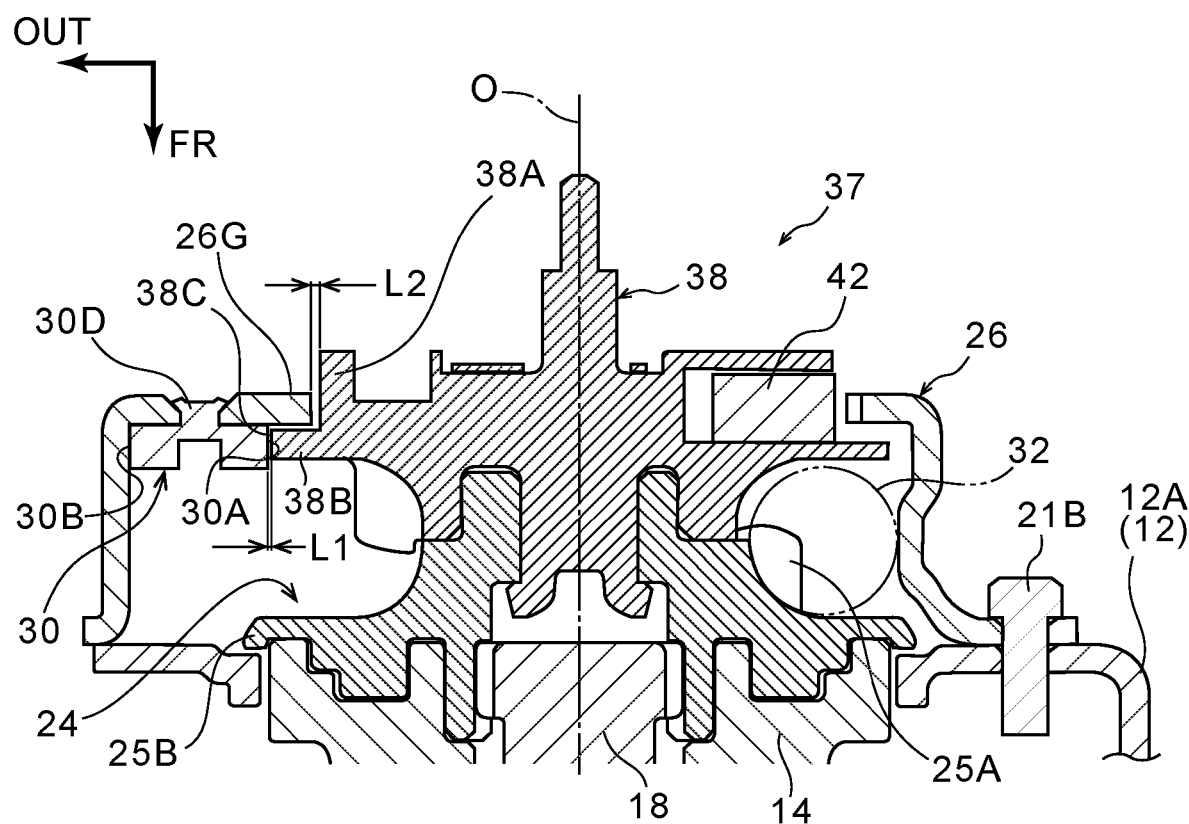
FIG. 5 is a sectional diagram of the webbing take-up device according to the exemplary embodiment of the present invention, which is a sectional diagram cut along line X-X in FIG. 4.

As illustrated in FIG. 3, the lock mechanism 37 includes a lock base 38 that serves as a rotary member, a lock pawl 42 that is provided at the lock base 38, and a sensor mechanism, which is not shown in the drawings, that is activated when there is an emergency during a vehicle collision or the like. The lock base 38 is provided at one axial direction end side (the vehicle rear side) of the spool 14. In more detail, as illustrated in FIG. 5, a vehicle front side of the lock base 38 is linked with a pinion 24. The lock base 38 includes a main body portion 38A, at which the lock pawl 42 is mounted, and a flange 38B provided at the outer periphery of the main body portion 38A. When the sensor mechanism that is not shown in the drawings is activated, the lock pawl 42 moves toward the outer side in a diametric direction of the lock base 38, and the lock pawl 42 meshes with ratchet teeth 26G of a ratchet hole 26E (see FIG. 2) of the cover plate 26, which is described below. Rotation of the lock base 38 during a vehicle emergency in a pull-out direction (the direction of arrow B shown in FIG. 3) that is the opposite direction to the take-up direction, is restricted by this meshing.

Torsion Shaft

A torsion shaft 18 that serves as an axle portion is accommodated in an axial center portion of the spool 14. The torsion shaft 18 is formed in a circular rod shape whose axial direction is substantially in the vehicle front-and-rear direction. One end portion (a portion at the vehicle front side) of the axial direction of the torsion shaft 18 is retained by the spool 14 in a state in which relative rotation of the torsion shaft 18 with respect to the spool 14 is prevented. The other end portion (a portion at the vehicle rear side) of the axial direction of the torsion shaft 18 is linked to the lock base 38 via the pinion 24 that is described below. As illustrated in FIG. 5, the lock base 38 is linked to the spool 14 by the pinion 24 and the torsion shaft 18 in a state in which relative rotation of the lock base 38 with respect to the spool 14 is prevented.

Pinion

The pinion 24 is disposed at the vehicle rear side relative to the frame 12 (see FIG. 1) but at the vehicle front side relative to the cover plate 26 (see FIG. 1), which is described below. An axial direction of the pinion 24 is substantially in the vehicle front-and-rear direction, and the pinion 24 is linked with the torsion shaft 18 and the lock base 38 (see FIG. 5). As illustrated in FIG. 3, a tooth portion 25 is formed at the outer periphery of the pinion 24. The tooth portion 25 is constituted by a plural number of engaging teeth 25A. A flange 25B is also provided at the outer periphery of the pinion 24, adjacent to the vehicle front side of the tooth portion 25. The pinion 24 is joined to the lock base 38. Thus, the rotary member is structured by the pinion 24 and the lock base 38.

The plural engaging teeth 25A are formed in radiating shapes at constant angular intervals around the central axis of the pinion 24. Distal ends of the engaging teeth 25A are disposed such that, when the pinion 24 rotates, the distal ends trace a circular path passing beside an opening portion 31 (see FIG. 2) at an axial direction distal end portion (a vehicle lower side end portion) of a pipe 28 (see FIG. 2), which is described below. When a rack 32 (see FIG. 2), which is described below, contacts the engaging teeth 25A and the pinion 24 rotates (about the axis thereof), the pinion 24 applies rotary force to the spool 14. In this situation, as illustrated in FIG. 5, the rack 32 is sandwiched and rotates between the flange 25B of the pinion 24 and the flange 38B of the lock base 38.

Cover Plate

As illustrated in FIG. 2, the cover plate 26, which serves as an example of an outer periphery body, is attached to a rear face 17 of the frame 12. The cover plate 26 is superposed with and fixed to the leg plate 12A of the frame 12 from the vehicle rear side thereof, using the rivets 21A and the rivets 21B. More specifically, the cover plate 26 includes a rear wall portion 26A, a peripheral wall portion 26B, a pipe attachment portion 26C and a flange 26D. The cover plate 26 functions to accommodate the rack 32, which is described below, to be movable when the rack 32 emerges from the pipe 28.

The rear wall portion 26A is a wall portion substantially along the vehicle width direction and the vehicle vertical direction. The rear wall portion 26A is disposed to oppose the leg plate 12A of the frame 12 in the vehicle front-and-rear direction. The ratchet hole 26E is formed penetrating through the rear wall portion 26A in the vehicle front-and-rear direction at a central region of the rear wall portion 26A in the vehicle width direction and the vehicle vertical direction. The ratchet hole 26E includes the plural ratchet teeth 26G which, viewed in the vehicle front-and-rear direction, are arrayed in the circumferential direction of the ratchet hole 26E.

The peripheral wall portion 26B is an interior wall face that intersects the rotation radial direction of the lock base 38. The peripheral wall portion 26B extends to the vehicle front side from peripheral edges of the rear wall portion 26A. Viewed in the vehicle front-and-rear direction, the peripheral wall portion 26B is arranged in an annular shape so as to encircle the ratchet hole 26E.

As illustrated in FIG. 2, the pipe attachment portion 26C is formed integrally with the peripheral wall portion 26B in a region at a vehicle upper side end portion of a vehicle width direction inner side end portion of the peripheral wall portion 26B. That is, the pipe attachment portion 26C is formed integrally with the peripheral wall portion 26B at the vehicle width direction inner side end portion and vehicle upper side end portion relative to a central axis line K of the spool 14 (see FIG. 3). The pipe attachment portion 26C widens so as to engage with a circumferential direction portion of a flange portion 29 of the pipe 28, which is described below.

The flange 26D is a portion that protrudes substantially in the vehicle width direction and the vehicle vertical direction from an outer periphery of the peripheral wall portion 26B. Plural hole portions 26F are formed in the flange 26D. The hole portions 26F penetrate through the flange 26D in the vehicle front-and-rear direction, matching up with the plural second hole portions 13B. The hole portions 26F are formed with larger diameters than outer diameters of the shaft portions of the rivets 21A and outer diameters of the shaft portions of the rivets 21B. The flange 26D is fastened to the frame 12 by the rivets 21A and the rivets 21B.

Figure 4:
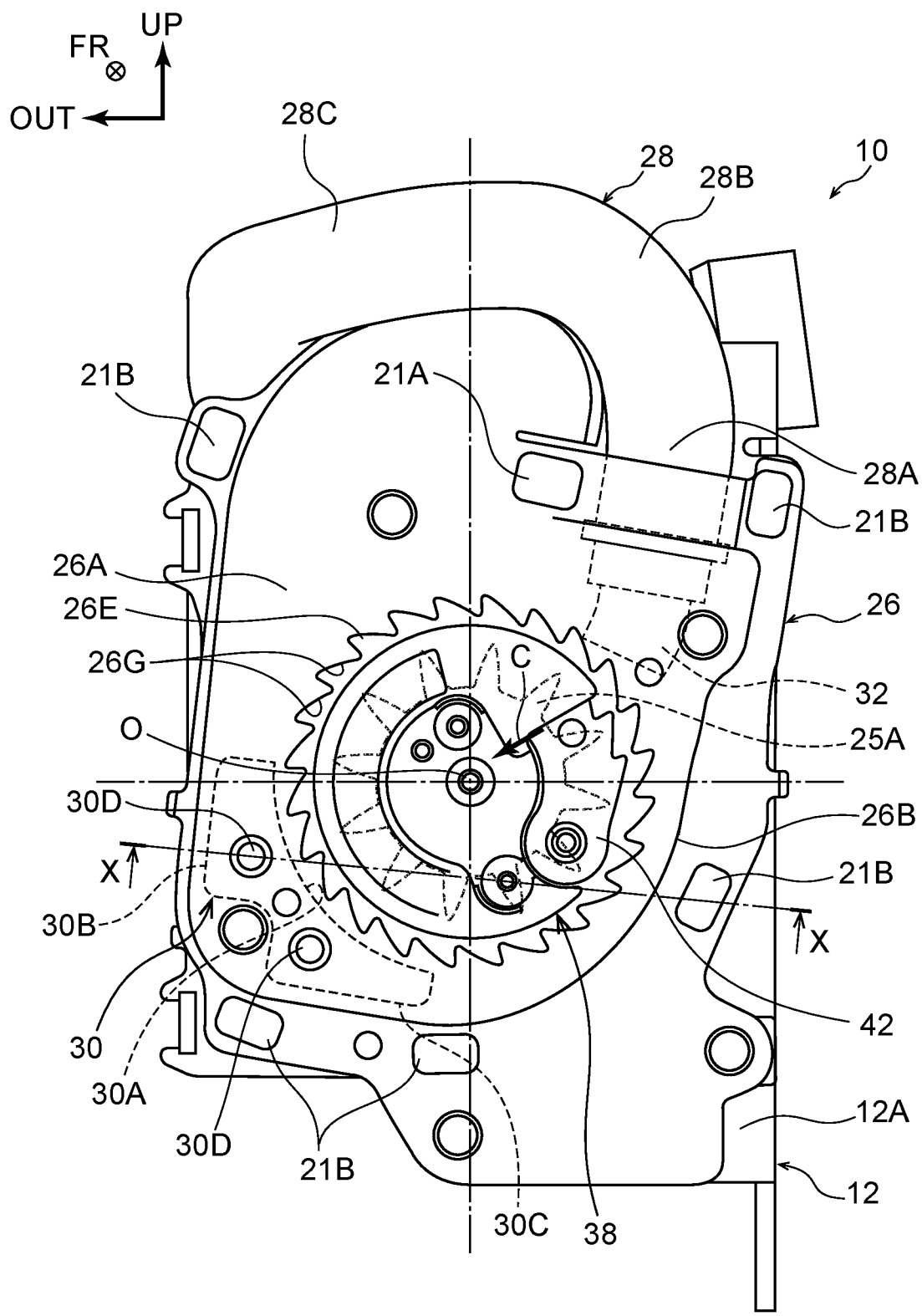
FIG. 4 is a front view of the webbing take-up device according to the exemplary embodiment of the present invention.

As illustrated in FIG. 4, a guide 30 that serves as a bracing portion is provided at a back face (the face at the vehicle front side) of the rear wall portion 26A. The guide 30 is provided at the vehicle width direction outer side and vehicle lower side of the rear wall portion 26A. The guide 30 is provided at the opposite side of a rotation center O of the pinion 24 from a location at which the tooth portion 25 and rack 32 contact. The guide 30 is fixed to the rear wall portion 26A by a pair of rivets 30D. The guide 30 includes a curved wall face 30A, a vertical wall face 30B and a horizontal wall face 30C. The curved wall face 30A is a contact surface in a curved arc shape that is formed so as to oppose an outer periphery face of the lock base 38. The vertical wall face 30B is formed substantially in the vehicle vertical direction, and the horizontal wall face 30C is formed substantially in the vehicle width direction. The vertical wall face 30B and horizontal wall face 30C abut against a back face of the peripheral wall portion 26B (the face thereof at the side at which the pinion 24 is disposed).

As illustrated in FIG. 5, the guide 30 is provided such that, if a distance between the curved wall face 30A and an outer periphery face (an outer periphery face 38C) of the flange 38B of the lock base 38 is represented by L1, and a distance between tip portions of the ratchet teeth 26G and the main body portion 38A of the lock base 38 is represented by L2, then L1<L2. Thus, in the present exemplary embodiment, when the pinion 24 and the lock base 38 are decentered toward the side thereof at which the guide 30 is disposed, the curved wall face 30A of the guide 30 and the outer periphery face 38C of the flange 38B contact before the ratchet teeth 26G contact the main body portion 38A. By supporting the lock base 38 serving as the rotary member to be rotatable as described above, the guide 30 limits contact between the ratchet teeth 26G and an outer periphery face of the main body portion 38A adjacent to the lock pawl 42.

Pipe

As illustrated in FIG. 2, the pipe 28 is attached to the leg plate 12A of the frame 12. The pipe 28 is formed in a circular tube shape. An inner diameter of the pipe 28 is larger than an outer diameter of the rack 32 such that the pipe 28 accommodates the rack 32, which is described below, and the rack 32 is movable in an axial direction of the rack 32. The pipe 28 is inflected at, for example, three locations. More specifically, the pipe 28 is provided with a base end portion 28A, a first inflection portion 28B, a second inflection portion 28C, a linear portion 28D, a third inflection portion 28E, and a mounting portion 28F.

As illustrated in FIG. 2, the base end portion 28A is a portion of the pipe 28 that extends linearly with the axial direction thereof substantially in the vehicle vertical direction. The flange portion 29 is provided at an axial direction portion of the base end portion 28A. The flange portion 29 protrudes in the diametric directions of the base end portion 28A. The opening portion 31, which opens in the axial direction of the base end portion 28A, is formed at one end of the base end portion 28A (the lower end in FIG. 2). A micro gas generator 34 is provided at the mounting portion 28F.

Rack

The rack 32 illustrated in FIG. 2, which serves as a moving member, is a rod-shaped member fabricated from resin. In more detail, the rack 32 is fabricated from a synthetic resin. Thus, the rack 32 is formed in a cylindrical shape (rod shape) of a material that is softer than the lock base 38 and the pinion 24 (see FIG. 3). The rack 32 is accommodated inside the pipe 28 so as to be movable in the axial direction of the rack 32. A sealing ball 44 is also disposed inside the pipe 28, between the rack 32 and the micro gas generator 34. The shape of the rack 32 in a cross section orthogonal to the movement direction (axial direction) thereof is a circle.

Due to pressure of a gas (fluid) supplied from the micro gas generator 34 during a vehicle emergency, the rack 32 illustrated in FIG. 2 moves inside the pipe 28, emerges outside the pipe 28, and moves inside the cover plate 26. As a result of this movement, the rack 32 contacts the tooth portion 25 (see FIG. 3 and FIG. 4) from the distal end side of the rack 32 (the side thereof at which the pinion 24 is disposed), and causes the pinion 24 to rotate about the axis of the pinion 24. Thus, by moving and contacting (entering and engaging with) the engaging teeth 25A of the pinion 24 (see FIG. 3), the rack 32 applies rotary force in the circumferential direction of the pinion 24 and spool 14.

Micro Gas Generator

The micro gas generator 34 illustrated in FIG. 2 is electronically connected, via an electronic control unit (ECU) that serves as a controller, with a collision prediction sensor, which is not shown in the drawings, provided at the vehicle. When an impact at a time of vehicle collision is predicted by the collision prediction sensor, the micro gas generator 34 is activated by the ECU, and gas generated by the micro gas generator 34 is supplied into the pipe 28. That is, the micro gas generator 34 is a gas generator, which is an aspect of a fluid supply means.

Operation and Effects

Now, operation and effects of the webbing take-up device 10 according to the present exemplary embodiment are described.

Overall Operation of the Webbing Take-up Device

In the webbing take-up device 10 illustrated in FIG. 1, during a vehicle collision, which is one aspect of an emergency of the vehicle that is not shown in the drawings, when the lock pawl 42 meshes with the ratchet teeth 26G of the ratchet hole 26E (see FIG. 2), rotation of the lock base 38 in the pull-out direction is limited. If the micro gas generator 34 (see FIG. 2) is activated by the ECU during the vehicle collision, high-pressure gas is momentarily supplied from the micro gas generator 34 to the inside of the pipe 28. The rack 32 inside the pipe 28 illustrated in FIG. 2 is moved by the pressure of this gas, and the rack 32 is ejected from the axial direction distal end side of the pipe 28. When the ejected rack 32 meshes with the engaging teeth 25A of the pinion 24 illustrated in FIG. 3 and pushes the engaging teeth 25A to the vehicle lower side, the pinion 24 is rotated in the take-up direction. When the pinion 24 rotates in the take-up direction, the spool 14 is rotated in the take-up direction (the direction of arrow A). As a result, the webbing 16 is taken up onto the spool 14, and a restraint force on a vehicle occupant from the webbing 16 is increased.

Supporting of the Lock Base by the Guide

As described above, when the micro gas generator 34 is activated and the rack 32 engages with the engaging teeth 25A of the pinion 24 during a vehicle collision, the rack 32 rotates the pinion 24 and lock base 38 that serve as the rotary member. Thus, the operation of taking up the webbing 16 in the direction of arrow A is commenced. When the rack 32 engages with the engaging teeth 25A of the pinion 24, because of resilience of the rack 32 that is fabricated from resin, the rack 32 pushes the pinion 24 and lock base 38 to the rotation center O side (the side indicated by arrow C in FIG. 4). When the pinion 24 and lock base 38 are decentered by this pushing, the lock base 38 is supported by the guide 30 to be rotatable. Thus, contact between the ratchet teeth 26G and the main body portion 38A of the lock base 38 is restricted.

Figure 6:
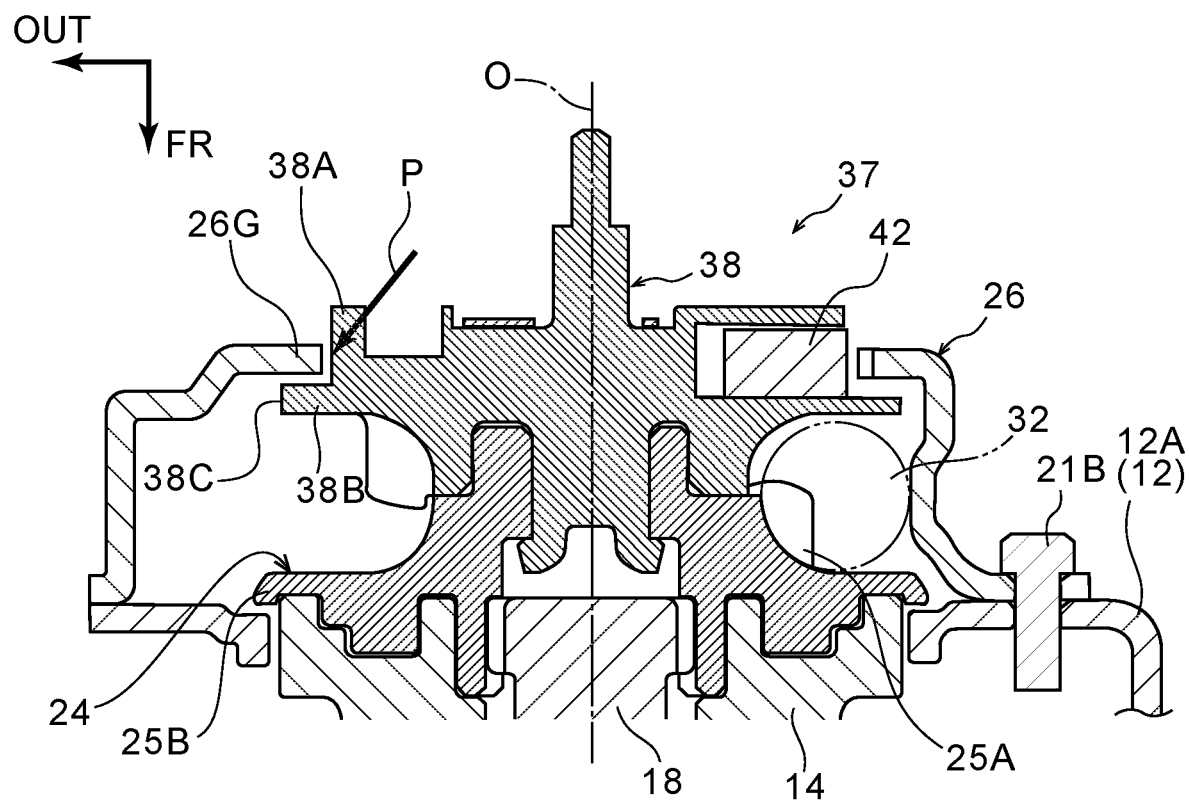
FIG. 6 is a sectional diagram of a webbing take-up device according to a comparative example, which is a sectional diagram of a region corresponding to the exemplary embodiment.

Taking a webbing take-up device with a conventional structure as a comparative example, the present exemplary embodiment and the comparative example contrast as follows. As illustrated in FIG. 6, the comparative example is different in that the guide 30 included in the present exemplary embodiment is not provided.

In the comparative example, when the rack 32 engages with the engaging teeth 25A of the pinion 24 and pushes the engaging teeth 25A to the rotation center O side, the pinion 24 and the lock base 38 connected to the pinion 24 are decentered in the pushing direction. As a result, the outer periphery face of the main body portion 38A contacts the tip portions of the ratchet teeth 26G (see position P in FIG. 6). This contact causes rotation resistance of the pinion 24 and lock base 38, and a rotation force of the spool 14 for taking up the webbing 16 is reduced. Thus, in the comparative example, it is necessary to devise measures such as using high-hardness components for the ratchet teeth 26G, the lock base 38 and the like, raising output force of the micro gas generator 34 in order to assure rotation force on the spool 14, and the like.

In the present exemplary embodiment, by contrast, because the guide 30 is provided, contacting of the ratchet teeth 26G against the lock base 38 is inhibited. More specifically, as mentioned above, the guide 30 is provided such that the relationship L1<L2 applies (see FIG. 5). Therefore, when the rack 32 contacts the engaging teeth 25A of the pinion 24 and pushes the pinion 24 and lock base 38 to the rotation center O side, decentering the pinion 24 and lock base 38, the curved wall face 30A of the guide 30 and the outer periphery face 38C of the flange 38B contact together before the ratchet teeth 26G and the main body portion 38A contact together. In the present exemplary embodiment described above, because the guide 30 supports the lock base 38 that serves as the rotary member to be rotatable, contact of the ratchet teeth 26G against the outer periphery face of the main body portion 38A may be inhibited.

In the present exemplary embodiment, the flange 38B at which the outer periphery face 38C is provided functions to support the decentered pinion 24 and lock base 38 to be rotatable. The flange 38B also functions to limit movement of the pinion 24 and lock base 38 in a thrust direction (the axial direction).

According to the present exemplary embodiment, even when the pinion 24 and lock base 38 are decentered by contacting together of the rack 32 and the engaging teeth 25A of the pinion 24, the lock base 38 does not contact the ratchet teeth 26G but contacts and is supported by the curved wall face 30A of the guide 30. Therefore, a surface pressure that the lock base 38 is subjected to as a result of contacting another member may be lowered. When the surface pressure that the lock base 38 is subjected to is lowered, the hardnesses of the materials of the ratchet teeth 26G, the lock base 38 and the like may be lowered, and fabrication costs may be suppressed. Further, because contacting of the ratchet teeth 26G against the main body portion 38A is inhibited, a reduction in rotation force of the spool 14 is restrained. Therefore, take-up efficiency of the webbing 16 when the micro gas generator 34 is activated may be improved, and output force of the micro gas generator 34 may be lowered. If the output force of the micro gas generator 34 is lowered, fabrication costs may be suppressed. Furthermore, because movement of the lock base 38 in the axial direction is inhibited, positional offsets when the lock pawl 42 meshes with the ratchet teeth 26G may be made smaller, and a bite margin may be made smaller. If a spacing, bite margin or the like is made smaller, components may be reduced in size.

As illustrated in FIG. 4, the rack 32 ejected from the base end portion 28A of the pipe 28 contacts the engaging teeth 25A at the vehicle upper side of the vehicle width direction inner side of the pinion 24. Consequently, in the present exemplary embodiment, the pinion 24 and the lock base 38 connected with the pinion 24 are pushed to the rotation center O side (in the direction of arrow C) by the rack 32 fabricated from resin and are decentered. The guide 30 according to the present exemplary embodiment is not provided over the whole outer periphery of the ratchet hole 26E (see FIG. 2) but is provided at the vehicle width direction outer side and vehicle lower side of the cover plate 26. That is, the guide 30 sandwiches the rotation center O at the opposite side thereof from the location at which the rack 32 and the engaging teeth 25A contact together. Thus, the guide 30 is provided at the side toward which the pinion 24 and lock base 38 are decentered. In the present exemplary embodiment, because the direction in which the pinion 24 and lock base 38 are decentered is determined in advance, it is sufficient to provide the guide 30 only at the side toward which the pinion 24 and lock base 38 are decentered. According to the present exemplary embodiment, because there is no need to provide the guide 30 over the whole of the outer periphery of the pinion 24 and lock base 38, fabrication costs may be suppressed.

The vertical wall face 30B and horizontal wall face 30C of the guide 30 according to the present exemplary embodiment abut against the back face of the peripheral wall portion 26B (the face at the side thereof at which the pinion 24 is disposed) of the cover plate 26 (see FIG. 5). The guide 30 is fixed to the rear wall portion 26A by the pair of rivets 30D. According to the attachment structure of the guide 30 in the present exemplary embodiment, a pushing force that the curved wall face 30A receives from the pinion 24 and lock base 38 is directly transmitted to the peripheral wall portion 26B of the cover plate 26 by the abutting of the guide 30 against the peripheral wall portion 26B. That is, because the guide 30 according to the present embodiment bears the pushing force with the peripheral wall portion 26B, a fixing strength of the rivets 30D may be reduced. Hence, if the fixing of the guide 30 can be simplified, fabrication costs of the webbing take-up device 10 may be suppressed.

The present invention is not limited by the exemplary embodiment described above but encompasses the variant example described below.

Variant Example

Figure 7A:
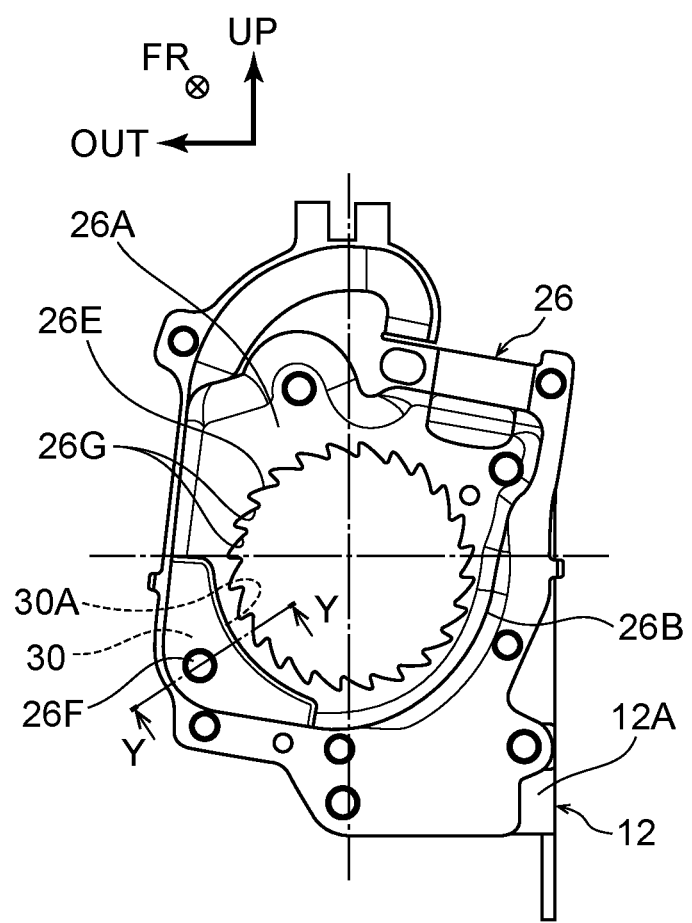
FIG. 7A is a front view of a cover plate according to a variant example of the exemplary embodiment of the present invention.
Figure 7B:
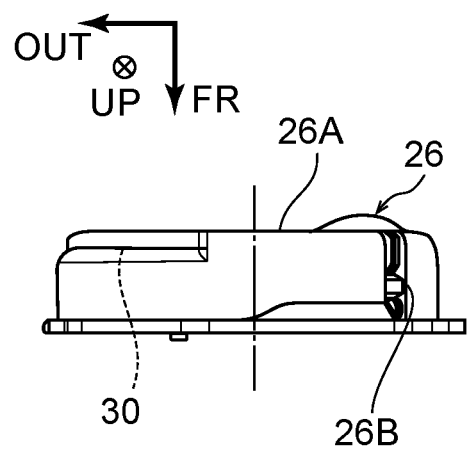
FIG. 7B is a bottom view of the cover plate according to the variant example of the exemplary embodiment of the present invention.
Figure 7C:
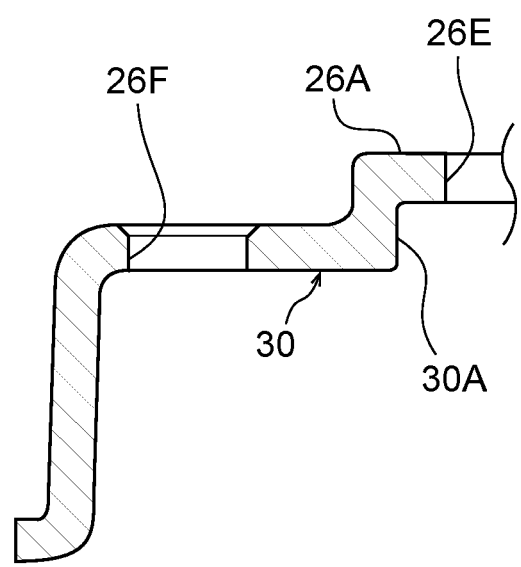
FIG. 7C is a sectional diagram of the cover plate according to the variant example of the exemplary embodiment of the present invention (a sectional diagram cut along line Y-Y in FIG. 7A).

The guide 30 according to the present exemplary embodiment is fixed to the rear wall portion 26A by the pair of rivets 30D, but the guide 30 according to the variant example is formed integrally with the cover plate 26. A front view illustrating the exterior of the cover plate 26 according to this variant example is depicted in FIG. 7A. FIG. 7B is a bottom view of the cover plate 26, and FIG. 7C is a sectional diagram of a section cut along line Y-Y of FIG. 7A. As illustrated in FIG. 7B and FIG. 7C, the rear wall portion 26A of the cover plate 26 is plastically deformed toward the vehicle front side at the guide 30. That is, the cover plate 26 is formed by press-machining of a metal plate member; a region for forming the guide 30 is provided at a pressing die in advance. Thus, even though the guide 30 is formed integrally with the cover plate 26 by press-machining, the lock base 38 may be supported to be rotatable by the curved wall face 30A. According to the webbing take-up device 10 according to the variant example, because there is no need, as when the guide 30 is formed as a separate component, to attach the guide 30 to the cover plate 26 subsequently, a number of fabrication steps and a number of components may be reduced. Thus, fabrication costs of the webbing take-up device 10 may be reduced.

Supplementary Descriptions

In the webbing take-up devices 10 according to the present exemplary embodiment and the variant example, the lock pawl 42 is provided at the lock base 38 that serves as the rotary member and the ratchet teeth 26G are provided at the cover plate 26, but this is not limiting. It is sufficient that the ratchet teeth are provided at one of the lock base 38 and the cover plate 26 and the lock pawl 42 is provided at the other of the lock base 38 and the cover plate 26. For example, in contrast to the present exemplary embodiment, the ratchet teeth may be provided at the lock base 38 and the lock pawl provided at the cover plate 26.

Further, the ratchet teeth or lock pawl may be provided at the leg plate 12A of the frame 12 instead of at the cover plate 26, and the lock base 38 may be disposed at a position that enables locking with the frame 12.

In the present exemplary embodiment and the variant example, the rack 32 fabricated from resin rotates the spool 14 by engaging with the engaging teeth 25A of the pinion 24, but a method of rotation is not limited thus. For example, with a rack fabricated from metal that includes a gear portion, a method of rotation based on meshing this gear portion with a gear portion at the pinion side may be employed, or a method of rotation by abutting metal balls arrayed in a row with the tooth portion of the pinion may be employed.

In the present exemplary embodiment and the variant example, the pinion 24 and lock base 38 that serve as the rotary member are formed as separate bodies, but this is not limiting; the pinion 24 and lock base 38 may be formed as a single body. For example, the pinion 24 and lock base 38 may be formed as a single body by aluminium die-casting.

The frame 12 is not limited to being in a square tube shape as seen in the vehicle vertical direction; the frame 12 may have a polygonal tube shape other than a square tube shape. The leg plate 12A is not limited to a flat shape along the vehicle width direction and the vehicle vertical direction; the leg plate 12A may include a curved surface. The shape of the pipe 28 viewed in the axial direction thereof is not limited to a circular shape but may be a polygonal shape.

The disclosures of Japanese Patent Application No. 2016-245909 filed Dec. 19, 2016 are incorporated into the present specification by reference in their entirety.

Explanation of the Reference Symbols

10 Webbing take-up device
14 Spool
16 Webbing
24 Pinion (rotary member)
25 Tooth portion
26 Cover plate (outer periphery body)
26B Peripheral wall portion (interior wall face)
26G Ratchet teeth
30 Guide (bracing portion)
30A Curved wall face (contact surface)
32 Rack (moving member; rod-shaped member fabricated from resin)
38 Lock base (rotary member)
38B Flange
38C Outer periphery face
42 Lock pawl

The invention claimed is:

1. A webbing take-up device comprising:
   a spool that rotates in a take-up direction and takes up a webbing;
   a rotary member, a tooth portion being formed at an outer periphery of the rotary member, and the rotary member causing the spool to rotate due to a moving member contacting the tooth portion;
   an outer periphery body that covers the outer periphery of the rotary member;
   ratchet teeth that are provided at one of the rotary member or the outer periphery body;
   a lock pawl that is provided at another of the rotary member or the outer periphery body, the lock pawl restricting rotation of the rotary member in a pull-out direction by engaging with the ratchet teeth, the pull-out direction being an opposite direction to the take-up direction; and
   a bracing portion provided at the outer periphery body, the bracing portion maintaining a gap between the ratchet teeth and the other of the rotary member or the outer periphery body to restrict contact therebetween by supporting the rotary member.

2. The webbing take-up device according to claim 1, wherein: the rotary member includes a flange that restricts movement of the rotary member, relative to the outer periphery body, in an axial direction of the rotary member; and an outer periphery of the flange is supported by the bracing portion.

3. The webbing take-up device according to claim 1, wherein the bracing portion is provided at a side to which the rotary member is decentered by contact between the tooth portion and the moving member.

4. The webbing take-up device according to claim 1, wherein: the outer periphery body includes an interior wall face that intersects a rotation radial direction of the rotary member; and the bracing portion is fixed to the outer periphery body in a state in which the bracing portion abuts the interior wall face.

5. The webbing take-up device according to claim 1, wherein: the outer periphery body is formed of a press-machined plate member; and the bracing portion is a plastically deformed portion of the outer periphery body.

6. The webbing take-up device according to claim 1, wherein: the moving member is a rod-shaped member fabricated from resin; and the rotary member is pushed toward the bracing portion by the tooth portion meshing with the moving member.

* * * * *